(12) United States Patent
Grady, Jr.

(10) Patent No.: US 7,158,020 B2
(45) Date of Patent: Jan. 2, 2007

(54) LED WARNING BEACON

(76) Inventor: James A. Grady, Jr., 2715 Morning Breeze Dr., Elko, NV (US) 89801

( * ) Notice: Subject to any disclaimer, the term of this patent is extended or adjusted under 35 U.S.C. 154(b) by 0 days.

(21) Appl. No.: 10/646,394

(22) Filed: Aug. 22, 2003

(65) Prior Publication Data

US 2004/0046678 A1   Mar. 11, 2004

Related U.S. Application Data

(60) Provisional application No. 60/409,542, filed on Sep. 10, 2002.

(51) Int. Cl.
*B60Q 7/00*   (2006.01)

(52) U.S. Cl. .................. 340/473; 340/321; 116/63 T; 362/800

(58) Field of Classification Search .......... 340/471, 340/472, 473, 474, 321, 332; 116/63 T; 40/903, 550, 600, 541; 362/612, 623, 546, 362/157, 362, 500
See application file for complete search history.

(56) References Cited

U.S. PATENT DOCUMENTS

| | | | | |
|---|---|---|---|---|
| 3,737,651 A * | 6/1973 | Shute | .......... | 362/222 |
| 3,800,430 A | 4/1974 | Samra | .......... | 340/95 R |
| 3,987,401 A | 10/1976 | Irving | .......... | 325/455 |
| 4,271,408 A * | 6/1981 | Teshima et al. | .......... | 345/83 |
| 4,298,869 A | 11/1981 | Okuno | .......... | 340/332 |
| 4,574,269 A | 3/1986 | Miller | .......... | 340/815.06 |
| 4,875,028 A * | 10/1989 | Chou | .......... | 340/473 |
| 4,952,910 A * | 8/1990 | Straten et al. | .......... | 340/473 |
| 4,999,753 A | 3/1991 | MacKenzie | .......... | 362/234 |
| 5,057,815 A | 10/1991 | Smoot | .......... | 340/468 |
| 5,149,190 A | 9/1992 | MacKenzie | .......... | 362/234 |
| 5,313,187 A | 5/1994 | Choi | .......... | 340/331 |
| 5,313,188 A | 5/1994 | Choi | .......... | 340/331 |
| 5,319,367 A | 6/1994 | Schulte | .......... | 340/961 |
| 5,323,728 A | 6/1994 | Hjelm | .......... | 116/63 T |
| 5,349,346 A * | 9/1994 | Wu | .......... | 340/908 |
| 5,394,138 A | 2/1995 | Stephens | .......... | 340/463 |
| 5,419,065 A * | 5/1995 | Lin | .......... | 40/550 |
| 5,585,782 A | 12/1996 | Yosko | .......... | 340/471 |
| 5,585,783 A * | 12/1996 | Hall | .......... | 340/473 |
| 5,594,433 A | 1/1997 | Terlep | .......... | 340/908.1 |
| 5,602,522 A | 2/1997 | Pacelli | .......... | 340/331 |
| 5,606,309 A * | 2/1997 | Smith | .......... | 340/473 |
| 5,627,513 A | 5/1997 | Weed | .......... | 340/473 |
| 5,644,291 A | 7/1997 | Jozwik | .......... | 340/472 |
| 5,684,452 A | 11/1997 | Wang | .......... | 340/321 |
| 5,754,097 A | 5/1998 | Vredenburgh | .......... | 340/432 |

(Continued)

FOREIGN PATENT DOCUMENTS

WO   WO 91/06078   5/1991

(Continued)

OTHER PUBLICATIONS

Silver Traffic Products brochure—undated.

(Continued)

*Primary Examiner*—Brent A. Swarthout
(74) *Attorney, Agent, or Firm*—Thorpe North & Western LLP

(57) ABSTRACT

A warning beacon includes a transparent housing, having a triangular shape suggestive of a warning sign, the housing having a front face, a back face, and side edges. A mounting plate is disposed within the housing between the front and back faces, and a plurality of LEDs are supported by the mounting plate, and oriented to provide light in at least a forward direction through the front face.

22 Claims, 5 Drawing Sheets

U.S. PATENT DOCUMENTS

| | | | | |
|---|---|---|---|---|
| 5,804,829 | A | 9/1998 | Palmer | 250/504 H |
| 5,831,522 | A | 11/1998 | Weed | 340/473 |
| 5,838,259 | A | 11/1998 | Tonkin | 340/903 |
| 5,877,681 | A | 3/1999 | Williams | 340/471 |
| 5,929,788 | A | 7/1999 | Vukosic | 340/908.1 |
| 5,963,126 | A | 10/1999 | Karlin | 340/321 |
| 5,970,639 | A * | 10/1999 | Hui | 40/610 |
| 6,155,694 | A | 12/2000 | Lyons | 362/228 |
| 6,270,236 | B1 * | 8/2001 | Brussog | 362/249 |
| 6,275,149 | B1 | 8/2001 | Tung | 340/473 |
| 6,276,079 | B1 * | 8/2001 | Tijanic | 40/591 |
| 6,292,097 | B1 | 9/2001 | Tewell | 340/471 |
| 6,371,637 | B1 | 4/2002 | Atchinson | 362/555 |
| 6,414,662 | B1 | 7/2002 | Havel | 345/83 |
| 6,483,439 | B1 * | 11/2002 | Vukosic | 340/815.65 |
| 6,547,410 | B1 | 4/2003 | Pederson | 362/35 |

FOREIGN PATENT DOCUMENTS

| | | |
|---|---|---|
| WO | WO 01/10676 | 2/2001 |
| WO | WO 02/41276 | 5/2002 |

OTHER PUBLICATIONS

Solar Marking Light brochure; Carmanah Model 501, One Mile Marking Light Dec. 11, 2001.

Federal Signal Corporation; Signaltech Led Warning Lights; 2 page ad, 2002.

North American Signal Company; Action-Lite Mini-Bars; 2 page ad—undated.

Specialty Manufacturing; Model 205 Mini Strobe and Series 500-615 and Series 700-955; 1 page ad from www.specmfg.com/products_5.html, Oct. 23, 2002..

JC Whitney Parts and Accessories; 1,000,000-CandlePower Strobe Lights; 1 page ad from www.jcwhitney.com/product.jhtml?CATID=4808&BQ=jcw2, Oct. 23, 2002.

JC Whitney Parts and Accessories; Double-Flash Zenon Strobe Lights; 1 page ad from www.jcwhitney.com.product.jhtml?CATID=4809&BQ=jcw2, Oct. 23, 2002.

360° Strobe Lights; 2 page ad from www.strobe-direct.com, Sep. 16, 2002.

Karst Sports; Speleo Technics, CX-LED, 1 page ad from www.karstsports.com, Oct. 30, 2001.

LED 3V Warning Device #499L3; 1 page ad from www.empco-lite.com, Sep. 16, 2002.

Lumastrobe, Strobe Lights, Warning Lights and Flashers; 1 page ad for The Helo-Quad Pack M-2 from www.lumastrobe.com, Sep. 16, 2002.

Austin Electronics—Standard Strobe—Litesaver emergency strobe lights beacons; 1 page ad from www.litesaver.net, Oct. 17, 2002.

* cited by examiner

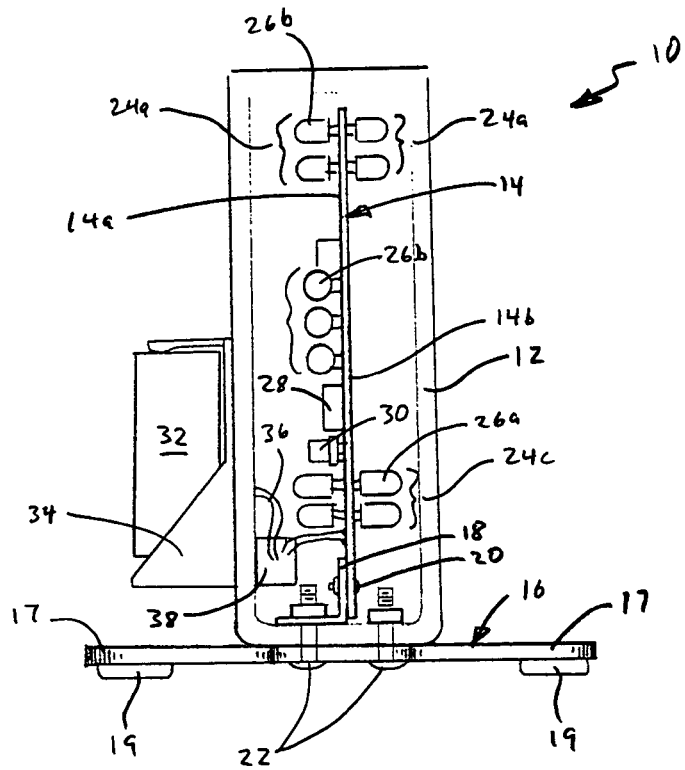
FIG. 3
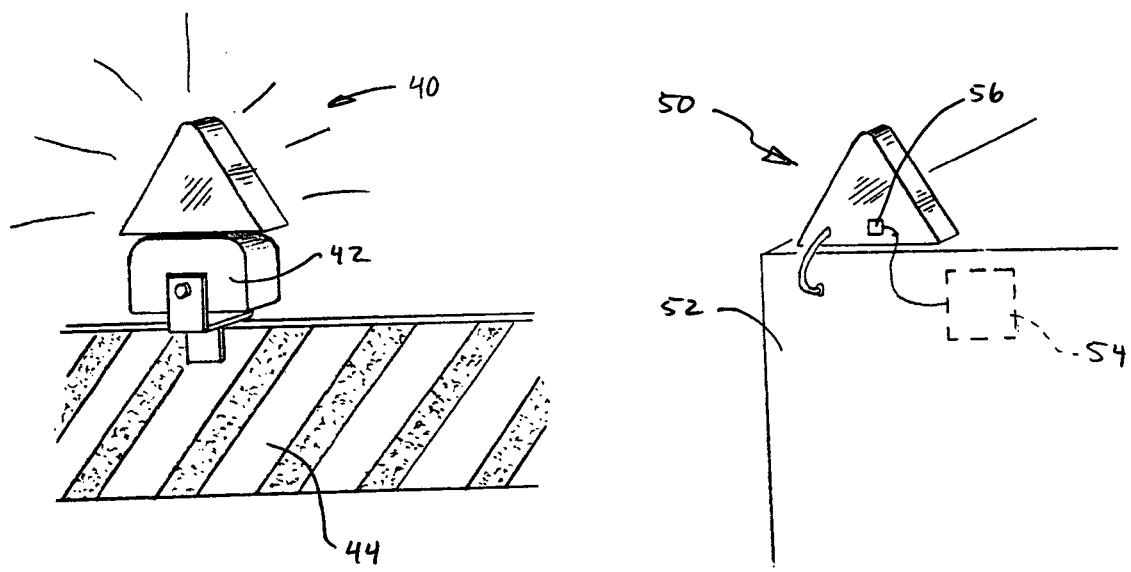
FIG. 4
FIG. 5

LED WARNING BEACON

This application claims priority from U.S. Provisional patent application Ser. No. 60/409,542, filed on Sep. 10, 2002.

BACKGROUND OF THE INVENTION

1. Field of the Invention

The present invention relates generally to warning beacons. More particularly, the present invention relates to an LED warning beacon that has a high light output and is multidirectional.

2. Related Art

Warning beacons are commonly used to provide a visual indication of danger or some condition requiring caution in a particular area. For example, warning beacons may be used to advise personnel in manufacturing facilities when an operation or machine is starting or stopping, or to warn personnel that they are entering a dangerous or restricted area. They can be mounted on vehicles or stationary equipment to warn other drivers or pedestrians of their presence. They can be permanently or temporarily placed to indicate the presence of a dangerous or hazardous location or condition, like highway construction barricades, or ocean buoys indicating the location of rocky shoals.

Warning beacons are also frequently used in conjunction with warning signs or indications. For example, highway signs indicating school zones, tight curves, or upcoming signal lights, and highway barricades delineating construction zones, frequently combine textual or non-textual warning signs with flashing lights to attract attention. Essentially any type of warning sign can be used in conjunction with flashing lights.

There is a great deal of thought and study that goes into devising better signs, beacons, and other devices for drawing people's attention to important information. The science of semiotics involves the study of signs and symbols, and seeks to devise better symbols for communicating information. A circle with a slash through it, or a walking human figure, for example, are internationally recognizable symbols that are commonly used on signs of various types because they quickly convey important information without regard to language, literacy, or culture. In many places, regionally recognized signs and symbols are gradually being replaced with more internationally recognized symbols. There a number of regional and internationally recognizable symbols that are commonly used on warning signs because they immediately convey the need for caution or attention. These include certain shapes, such as triangular, and colors, such as yellow or red.

There are a variety of types of warning beacons that have been developed and used. These provide various advantages and disadvantages. U.S. Pat. No. 5,929,788 to Vukosic (1999) discloses a warning beacon that is conical in shape and uses colored domes or covers to change the color of the light. U.S. Pat. No. 5,149,190 to MacKenzie (1992) provides a warning beacon with a small number of LEDs per unit, and uses a lithium battery pack to make the device portable. Both U.S. Pat. No. 6,292,097 to Tewell (2001) and U.S. Pat. No. 5,644,291 to Jozwik (1997) disclose warning beacons using conventional high voltage incandescent lights.

SUMMARY OF THE INVENTION

It has been recognized that it would be desirable to provide a warning beacon with a high light output, and which is omni-directional and which flashes to draw attention.

It would also be desirable to provide a warning beacon that combines the physically strong and symbolically recognizable shape of the triangle with more and higher powered LEDs, including colored LEDs, and which does not diffuse color and light output.

It is the principle object of the present invention to provide an improved warning beacon wherein the illumination is provided by LEDs.

The invention advantageously provides a warning beacon, comprising a transparent housing, having a triangular shape suggestive of a warning sign, and including a front face, a back face, and side edges. A mounting plate is disposed within the housing between the front and back faces, and a plurality of LEDs are supported by the mounting plate, and oriented to provide light in at least a forward direction through the front face.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 3 is a side view of the warning beacon of FIG. 1.

FIG. 4 is a perspective view of an LED warning beacon attached to a barricade

FIG. 5 is a perspective view of an LED warning beacon attached to a piece of equipment.

DETAILED DESCRIPTION

Figure 1:
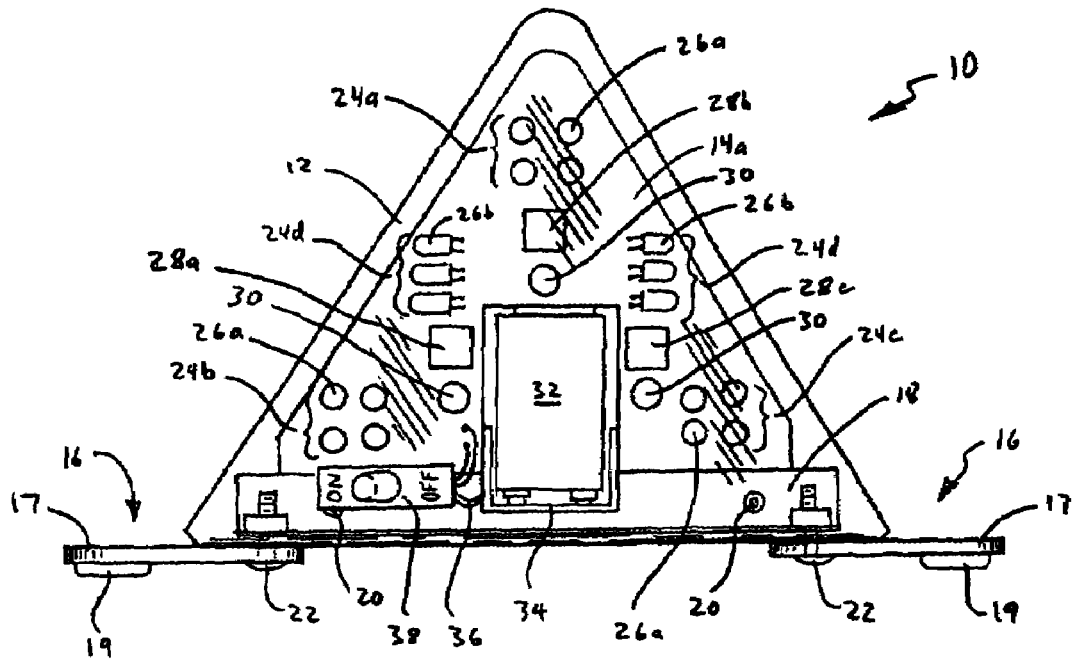
FIG. 1 is a front view of one embodiment of a warning beacon constructed in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 2:
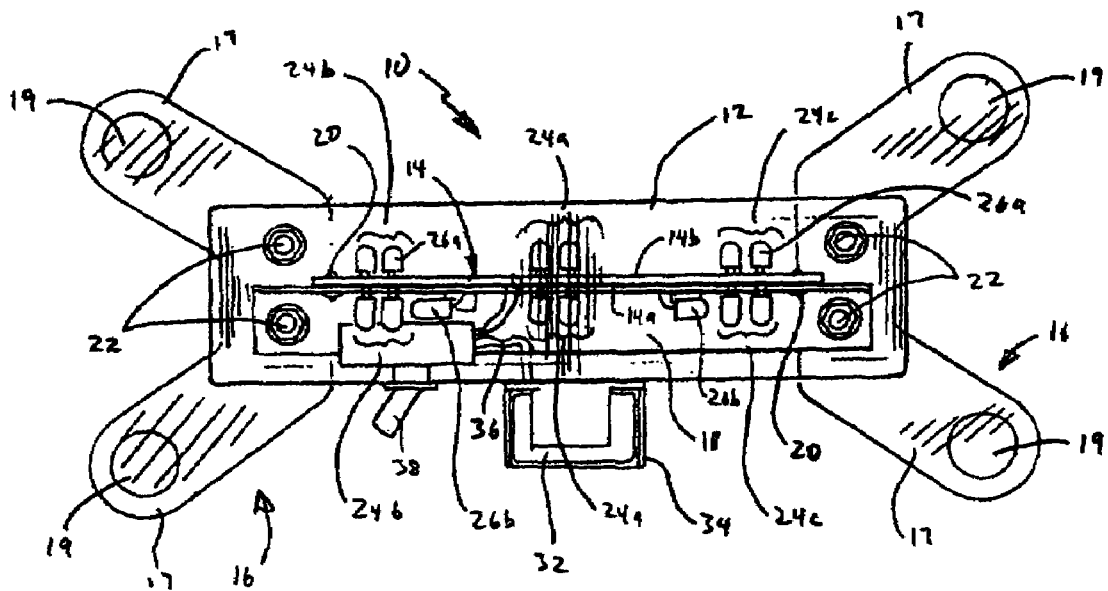
FIG. 2 is a top view of the warning beacon of FIG. 1.

FIGS. 1–3 provide front, side, and top views of one embodiment of a warning beacon 10 constructed in accordance with the present invention. The beacon includes a triangularly shaped transparent body or housing 12, defining an interior cavity, which encases a circuit board 14 and its components, and is attached to a base 16. The housing is made of an impact-resistant, transparent plastic material. One suitable material is a shatter-resistant acrylic such as Lucite® by DuPont. A suitable thickness is ¼ inch. Another suitable material is polycarbonate, such as Lexan®. The combination of the material of the housing and its triangular shape gives the beacon great strength and durability.

Figure 10:
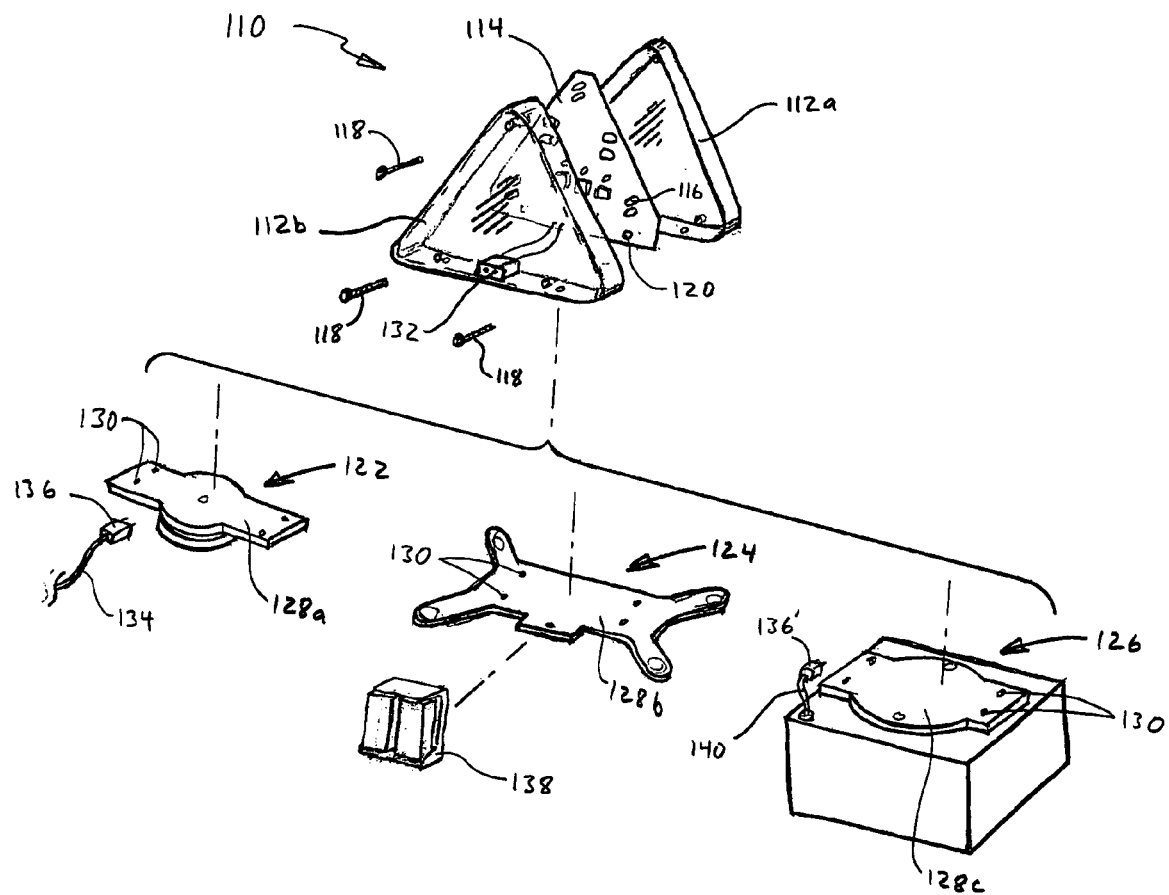
FIG. 10 is an exploded perspective view of an alternative embodiment of a warning beacon in accordance with the present invention, having an interchangeable base mounting system.

In the embodiment of FIGS. 1–3, the circuit board 14 is attached at its lower edge to an aluminum bracket 18 by means of rivets 20. Bolts 22 secure the aluminum bracket through the housing 12 and into the base 16. An alternative configuration of the housing and base is shown in FIG. 10, and described in more detail below.

Figure 7:
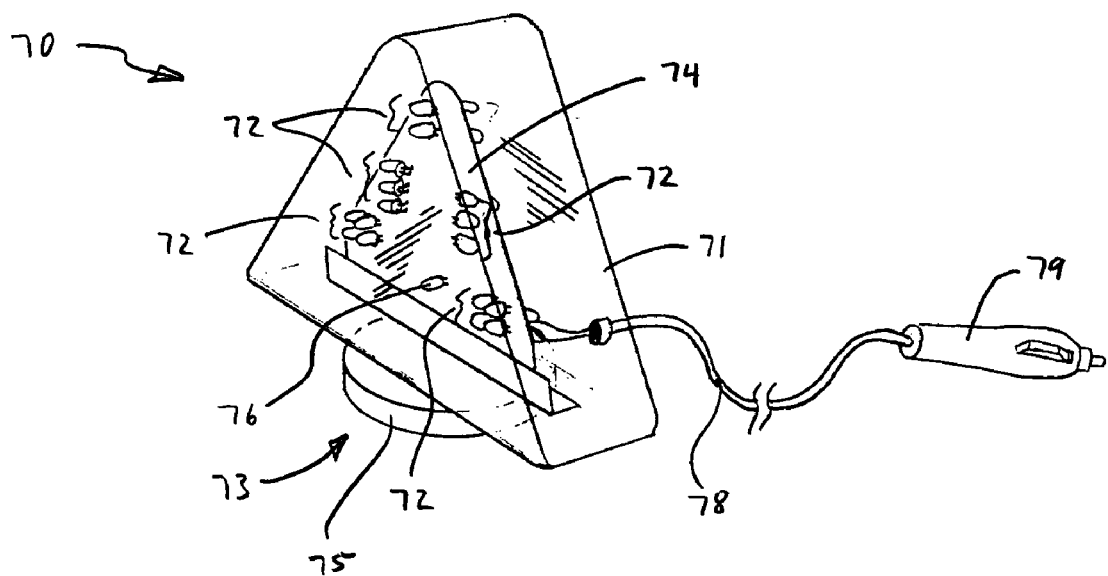
FIG. 7 is a perspective view of another embodiment of a warning beacon having a magnetic base.
Figure 9:
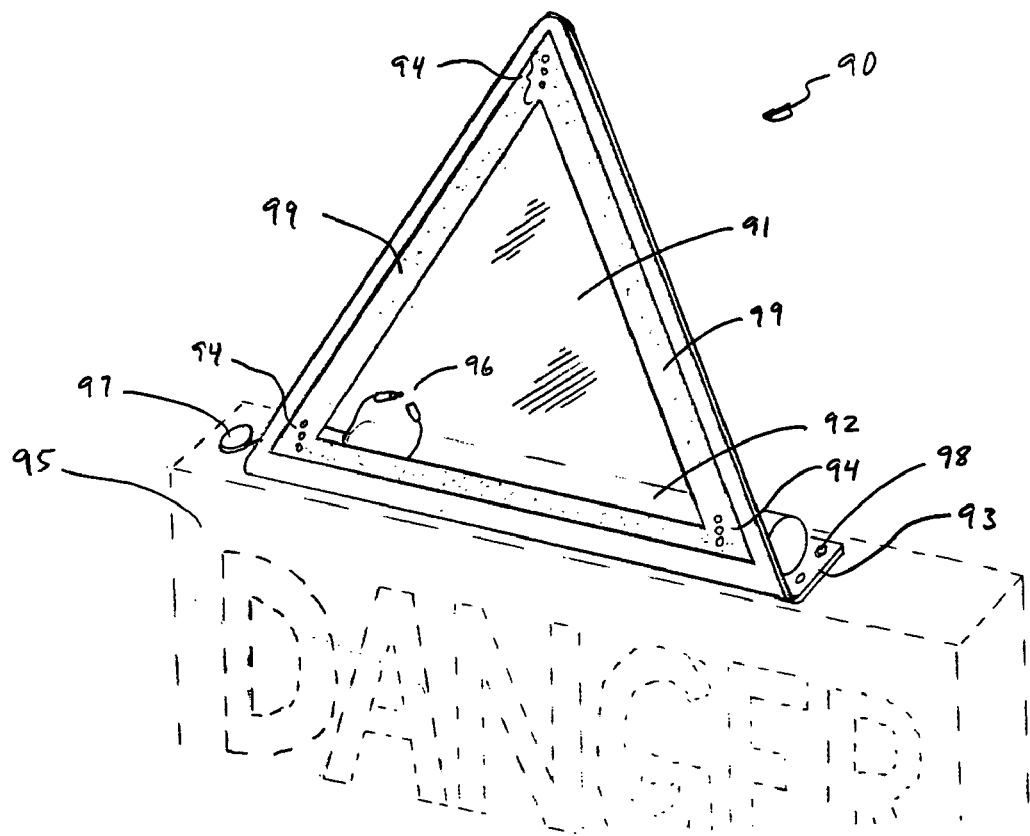
FIG. 9 is a perspective view of yet another embodiment of a warning beacon in accordance with the present invention.

Referring again to FIGS. 1–3, the circuit board 14 provides a mounting plate, and includes multiple clusters 24 of LEDs 26 disposed on its front face 14a and back face 14b, and circuitry for powering the LEDs to flash as desired. The LEDs are located on both sides of the circuit board, and point in multiple directions. For example, as shown in FIGS. 1–3, on the front side 14a of the circuit board, there is a top cluster 24a and two lower corner clusters 24b, 24c of four LEDs 26a that face forward. Additionally, there are two clusters 24d of three side-facing LEDs 26b located toward the sides of the circuit board. The back side 14b of the circuit board, on the other hand, includes three clusters 24a, 24b, 24c of four rear facing LEDs 26a at each corner of the circuit board, but no side facing LEDs. It will be apparent that the location, size, and direction of the clusters of LEDs can be arranged in any desired configuration. For example, in the embodiment shown in FIG. 1, the clusters contain from 3 to 4 LEDs per cluster. In the embodiment of FIG. 7, the clusters include from 2 to 4 LEDs. In the embodiment of FIG. 9, the LEDs are arranged in clusters of three at each corner of the upright panel, thus emphasizing its triangular shape.

The circuit board 14 is preferably opaque, and thus substantially blocks light from one side of the circuit board to the other. The acrylic housing 12 transmits about 92% of the light from the LEDs 26. However, at least some of the remainder is captured and reflected, so that the beacon 10 can still be seen from an angle, thus giving 360° visibility. Consequently, the transparent housing produces internal reflections, reflecting light from one side of the housing to the other, and producing a twinkling effect. This twinkling effect adds to the attention-getting advantages of the beacon without requiring additional power.

The LEDs 26 are preferably high intensity, narrow beam light-emitting diodes having a light output of at least 8000 mcandela, though LEDs with other characteristics can be used. The high intensity LEDs flash brightly to provide a low-current, high attention-getting device visible at up to one mile. The LEDs are also highly directional and project light out at a very tight angle. For example, the LEDs preferably have a beam width of from 6° to 12°. The tighter the beam, the brighter will be the light at a given distance. Outside of this beam, the light intensity is significantly diminished. This narrow focus helps provide high light intensity at long distances with a relatively small power output. The further one is from the device, the more the light pattern opens up to increase visibility. However, at close range, one outside the tight projection path of the LEDs will not experience highly intense light. Consequently, with proper placement of the beacon 10, an equipment operator or other person working close to the beacon is unlikely to be impaired by the light.

Advantageously, LEDs are available in a variety of colors, including red, orange, amber, white, blue, and green. The available beam width may depend on the color of the LEDs. For example, green LEDs in appropriate sizes and powers for this invention are currently available with beam widths down to 12° but not lower. However, red LEDs are available in beam widths down to 6°. Consequently, the color and beam width of the LEDs can be selected to provide the desired light intensity. For example, if a particular intensity is desired at a distance of ½ mile using red LEDs, and this intensity level is not met with a 12° beam width, then a beam width of 6° may be required.

The clear plastic housing 12 also works in conjunction with the LEDs 26 in other ways. First, because the housing is made of a clear plastic, the color of the projected light is not determined by the housing, but by the color of the LEDs themselves. Additionally, the nature of the housing allows the tight angle of projection offered by the LEDs to be fully utilized. Specifically, the distance at which the light can be seen is substantial (over 1 mile) partly because the housing does not diffuse the light from the LEDs.

The flashing pattern of the LEDs can be controlled in various ways. In the embodiment of FIGS. 1–3, the circuit board 14 includes a plurality of voltage regulating timer chips 28. Suitable timer chips are available from National Semiconductor. Each timer chip is interconnected to selected ones of the clusters 24 of LEDs, and provides a different time-based flashing signal to the LEDs. For example, the corner clusters of LEDs 24a–c on one side of the circuit board may be connected to a first timer chip 28a, the corner clusters of LEDs 24a–c on the other side can be connected to a second chip 28b, and the side-facing LED clusters 24d on both sides can be connected to a third timer chip 28c, each timer chip being configured to cause the associated LEDs to flash at a different rate. This configuration creates an apparently random flashing pattern, which is beneficial in attracting and keeping attention.

The randomness of the pattern is increased by the provision of a low tolerance capacitor 30 associated with each timer chip 28. The capacitor causes the current to the timer chip to fluctuate, thus causing the timing signal created by each timer chip to fluctuate. The result is a more random flashing pattern for each group of LEDs, thus adding to the overall random flashing effect. For the large beacon 10 shown in FIGS. 1–3, three timer chips are used. The smaller beacon 60 depicted in FIG. 6 includes two timer chips 62. Any desired number of timers may be used. The number is probably only limited by physical space on the circuit board, and the number of individual LEDs.

A beacon 70 with an alternative flash control system is depicted in FIG. 7. In this embodiment, the clusters 72 of LEDs on each side of the circuit board 74 are connected in series to a flashing LED 76, and then to the power supply line 78. This configuration causes the LEDs associated with each flashing LED to flash in sync with the flashing LED, and thus to flash in a different pattern on each side of the device. A flashing LED by its nature flashes at a slightly irregular speed, thus providing the desired random flashing pattern.

A beacon with a different type of flash control system is depicted in FIG. 5. In this embodiment, the beacon 50 is mounted to a piece of equipment 52. The piece of equipment may be a factory machine tool, a motor vehicle, or any other item. The piece of equipment includes a programmable logic controller or PLC 54. The PLC may be connected to a timer chip 56 on the circuit board of the beacon. The beacon takes input from the PLC, and illuminates in a certain way to provide a desired indication. For example, the beacon can be configured to illuminate a certain color or arrangement of LEDs, or flash in a desired pattern when the equipment is operating or when a certain fault signal is received from the PLC. This can provide maintenance or other personnel with important information about the status of the equipment from a distance.

Advantageously, the LED beacon uses relatively little power, especially compared to incandescent and some other types of beacons. In various embodiments constructed by the inventors, the beacon consumes from 20 to 120 milliamps depending on various factors. Obviously, more LEDs illuminated at a given time will consume more power. Thus, the illumination time and relative cycle time for the various LEDs will cause the power consumption to fluctuate, and so will the total number of LEDs. The color of the LEDs also affects power consumption. For example, blue and green LEDs of a given intensity require less power than other colors.

Power for the LEDs can be provided in many different ways. As noted above, the LEDs draw relatively low current, allowing the beacon to run continuously without causing a large power drain on the battery or equipment to which it is attached. The circuitry is such that the unit can receive DC power from various types of equipment, and is compatible with voltages ranging from 6V to 40V. Referring to FIG. 5, when the beacon is mounted to a piece of equipment 52, it can draw power through an electrical line 58 from that equipment. Alternatively, the beacon 70 of FIG. 7 includes a power cord 78 with a plug 79 configured to plug into a DC power outlet (e.g. a cigarette lighter) such as in an automobile.

Figure 6:
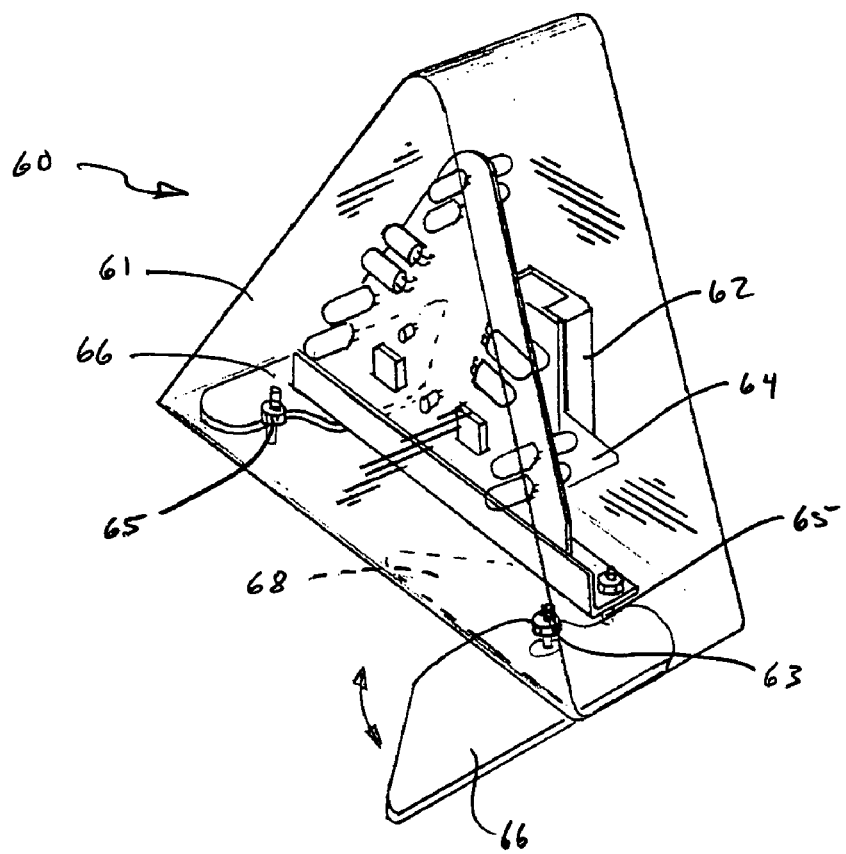
FIG. 6 is a perspective view of one embodiment of a warning beacon having fold-out support legs.

Because the LED beacon requires relatively little power, it can easily be powered by batteries, such as conventional alkaline cells. The use of alkaline cells presents less likelihood of harm to the environment when used batteries are discarded than other types of batteries, such as rechargeable lithium batteries. In the embodiments of FIGS. 1–3, the beacon 10 is powered by a 9 volt battery 32 disposed in a battery mount 34 on a side of the housing 12. Power supply wires 36 extend from the battery mount into the housing, and are connected to the circuit board in the appropriate places. In FIG. 1, the power supply wires extend through a switch 38 to allow the beacon to be turned on and off. In FIG. 6, the beacon 60 includes no switch, but is directly activated through connection of the 9 volt battery 62 into the battery mount 64. Turning the unit off requires removing the battery. The relatively small beacon of FIG. 6 can run continuously for about 36 hours on a single 9 volt battery. The larger beacon of FIG. 1 will run continuously for about 12 hours on a single 9 volt battery, or for about 24 hours on two batteries.

Figure 8:
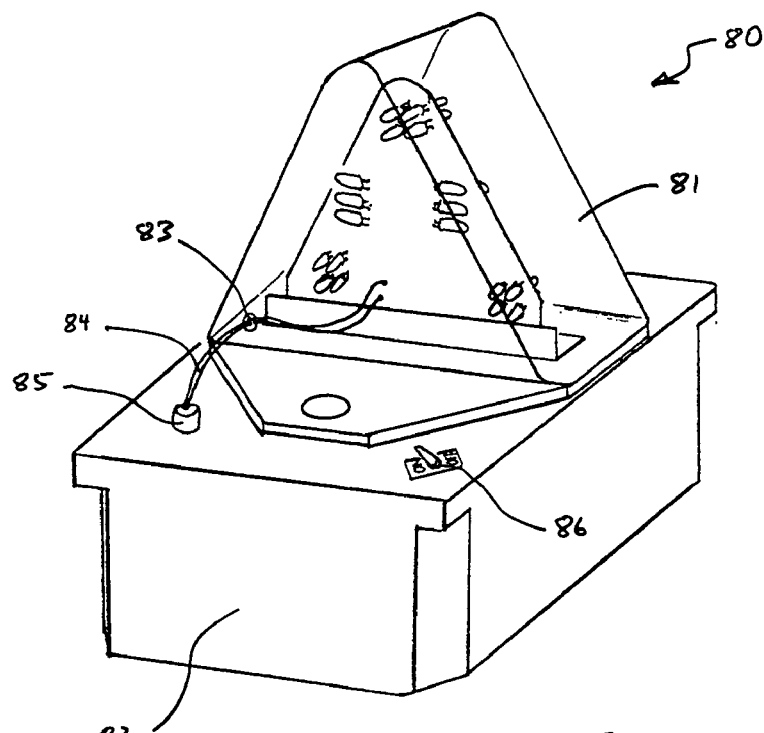
FIG. 8 is a perspective view of another embodiment of a warning beacon having a large battery base.

Different battery-powered embodiments are also shown in FIGS. 4, 8 and 9. In FIG. 4, the beacon 40 is attached to a large battery pack 42 that is attached to a barricade 44. This configuration is suitable for highway construction barricades, barrels, and the like. The barricade beacon can use either a rechargeable battery or disposable batteries. The embodiment of FIG. 8 provides a triangular beacon 80 mounted atop a large battery 82. This can be either a rechargeable battery or a disposable battery mounted in a reusable housing. The large battery serves both to provide power to the beacon and to give it a relatively heavy, stable base for a portable unit. In the embodiment of FIG. 8, the power supply wires 84 extend from within the housing 81 through a strain relief 83, and a pigtail extends to a connector 85 on the battery case. An on-off switch 86 is disposed in the top of the battery case. The inventors have found that this configuration can run continuously for about 1 month.

The flat panel beacon 90 depicted in FIG. 9 uses a plurality of 1.5 volt "D" size cells contained in a single battery pack 92 disposed on the bottom flange 93 of the panel 91. The cells are connected in series to provide the desired voltage. In this embodiment the LEDs 94 are not disposed within a housing, but are disposed in the face of the clear panel 91. The flat panel of FIG. 9 is preferably configured to mount atop a support structure, such as a warning sign 95. This configuration is intended to help draw attention to the sign. Given the small number and small size of the LEDs in this embodiment, the inventors have found that it can operate 24 hours a day for about 8 months with 6 "D" cells. A releasable connector 96 and pigtail are also provided to allow power to be drawn from an alternative source, if desired.

Because they are provided with their own power supply, the various battery-powered embodiments described above are highly portable. They can be easily transported and then set out for use in various locations, whether that use is temporary or intended to be relatively permanent. For example, police officers or emergency personnel can deploy the portable warning beacons at an accident site to help direct traffic around the site and encourage caution. It will be apparent that other power supply configurations and equipment can also be employed. For example, in remote locations where power is not available and/or maintenance is difficult or costly, a solar power system (not shown) could be included to provide continuous power for years. The various embodiments of beacons described can also be provided with a light sensor 97, as shown in FIG. 9, that causes the beacon not to operate in daylight. This can save battery power and extend the operational life of the unit.

The unit can also be manufactured in such a way as to accept AC power. For example, in the embodiment of FIG. 7, the pigtail 78 can be changed to accommodate both AC and DC power supplies. It will be apparent that the use of AC power will require a transformer somewhere to provide the needed DC power for the LEDs, though this transformer need not be incorporated into the beacon itself. For example, in the embodiment of FIG. 7, the pigtail could be provided with a wall-mount transformer (not shown) to allow interconnection to a conventional electrical outlet.

The base 16 supports and stabilizes the warning beacon, and can be configured in various ways, depending on the nature and configuration of the surface or equipment to which the beacon will be mounted. For example, the base of the warning beacon of FIG. 1 comprises fixed legs 17 that are connected to the housing 12 with bolts 22 and include resilient rubber feet 19 affixed to their extremities. The fixed legs can be made of plastic, such as the same plastic material of the housing, or other suitable materials.

As an alternative to fixed legs, another embodiment of a warning beacon 60 shown in FIG. 6 comprises a base having folding legs 66. These folding legs are affixed to the housing 61 at pivot points 63, and are configured to have an extended position as shown, and a retracted position 68, shown in dashed lines. A limit stop 65 is provided to limit the range of pivoting of the folding legs between these two positions. The folding legs fold into a compact shape below the housing, a configuration that is suitable for storage, yet fold out in opposing directions to provide a wide and stable base when in the extended position.

Another alternative base configuration for a warning beacon in accordance with the present invention is shown in FIG. 7. In this embodiment, the warning beacon 70 comprises a magnetic mount 73. The magnetic mount includes a powerful ring magnet (not visible) disposed in a cup 75 that is affixed to the bottom of the housing 71. The magnetic mount allows the warning beacon to be quickly and easily attached to any ferromagnetic surface, such as the hood or fender of an automobile, a piece of construction equipment, etc.

As yet another alternative, the base can be a battery pack, as shown in FIG. 8. In this embodiment, the housing 81 of the beacon 80 is mounted atop a large battery 82. This battery provides electrical power to the beacon for extended use, and, by virtue of its size and weight, provides a very stable support. The warning beacon 90 shown in FIG. 9 comprises a substantially upright transparent panel 91, with a rear support flange 93 that curves under the panel. The support flange includes holes 98 for fasteners to mount it to a warning sign 95 or other support structure.

It will be apparent that the housing and support base configurations shown with the various embodiments described above do not represent all possible configurations, and these may also be interchanged with each other to create combinations not shown. For example, with reference to FIG. 10, an alternative embodiment of a beacon 110 according to the present invention comprises a transparent, injection-molded housing 112 comprising a front half 112a and back half 112b. The housing halves are designed to encase a circuit board 114 which supports the LEDs 116 and related circuitry. The two halves of the housing are attached together with screws 118 located near the corners of the housing. The bottom two of the screws also pass through holes 120 in the circuit board to secure it in place inside the housing. The top screw does not contact the circuit board, allowing it to move to compensate for vibration.

The beacon 110 is designed to attach to any desired base, creating an interchangeable base system. For example, with the circuit board secured inside, the transparent housing 112 can be connected to a magnetic mount base 122, a fixed leg base 124, or a battery pack base 126, or any other type of base disclosed herein or compatible with the beacon of this invention. Each type of base includes a base plate 128 having mounting holes 130 that correspond to similar mounting holes associated with the housing.

The back half 112b of the housing includes a power receptacle 132 that allows a user to interconnect to any desired power supply. For example, with the magnetic mount base 122, a DC power cord 134 for attaching to a motor vehicle DC power outlet is provided with a plug 136 that is configured to insert into the receptacle. Alternatively, a battery mount 138 can be provided to attach to the fixed leg base 124 outside of the housing. The battery mount includes a plug (not visible in FIG. 10) that plugs into the power receptacle. As yet another alternative, the battery pack base 126 includes a power cord 140 with a plug 136' that inserts into the power receptacle. It will be apparent that other combinations not shown are also possible. With this system, any type or size of housing and beacon can be attached to any type of base, for a completely interchangeable system of beacons and support bases.

The triangular shape of the beacon provides a combination of the advantages of a flashing warning beacon with the easily recognizable triangular shape of a warning sign. Additionally, the beacon 90 of FIG. 9 includes reflective material 99 disposed around its perimeter. This reflective material, such as crushed glass-impregnated safety tape (e.g. from 3M Corp.) as is used on highway barricades, barrels, etc., enhances the visibility of the device, particularly for those viewing from a vantage point not within the tight projection pattern of the LEDs. Thus, for example, a motorist approaching a hazard site from an unexpected angle at which the LEDs 94 are not fully bright, will still see the face of the panel at a substantial distance through reflection of their vehicle lights, or reflection of sunlight in the daytime. Reflective tape can also be used with the other embodiments described above.

The embodiment of FIG. 9 could also be useful for truck drivers and the like. Drivers of heavy trucks frequently carry triangular reflective markers similar in size and shape to that shown in FIG. 9. These reflectors are used to indicate the presence and position of a truck that has pulled to the shoulder of a road, so as to help approaching motorists safely pass by. However, with the mere use of reflectors, the markers are not visible until the vehicle is within headlight distance. The beacon 90 of FIG. 9 could be provided with fold-out legs (not shown) to allow it to be used in a freestanding configuration. The flashing LEDs 94 of this device provide the desired indication to approaching motorists much earlier, thus increasing the margin of safety.

The invention thus provides an improved warning beacon with high output LED light technology, a strong triangular shape, and a clear housing to provide maximum visibility at long distances. The invention provides a beacon suited to heavy duty applications, a versatile beacon that can be used on a large variety of equipment both mobile and non-mobile, and a beacon with durability, low maintenance, and long life span. The invention advantageously enables bright visual indications to be provided utilizing inexpensive, low power LEDs. It can be mounted on vehicles to warn others of the vehicle's presence. It can also be mounted to stationary equipment such as welders, factory machinery, light plants, and the like. The beacon can be either hard-mounted to a piece of equipment, or placed on the equipment temporarily, such as with a magnetic mount, thus allowing it to be easily moved from one piece of equipment to another. It can also be attached to warning signs, or used as a freestanding device. It can be used as a stack light. It is also useful for highway barricades and warnings, to warn of open pits, rockfall areas, and to indicate remotely controlled devices that could be hazardous to persons nearby. Many other useS are also possible. Advantageously, it provides highly directional light in multiple directions with low power consumption.

The LEDs flash in random patterns which are extremely beneficial in attracting and keeping attention. The beacon can be configured to accept both AC and DC power, and can also be made with its own battery pack thus allowing it to be more portable. The high intensity LEDs provide a low current, high attention-getting light visible at up to one mile. The low current draw allows the beacon to run continuously without causing a power drain. The LEDs project the light out at a very tight angle to insure that the device is seen at very long distances, however at close range it does not impair an operator's line of sight.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A warning beacon, comprising:
   a) a transparent housing, having a triangular shape configured to provide substantial strength, and including a transparent front face, a transparent back face, and transparent side edges, wherein the housing is constructed from an impact resistant plastic material;
   b) a mounting plate, disposed within the housing between the front and back faces;
   c) a plurality of LEDs, supported by the mounting plate, and oriented to provide light in at least a forward direction through the front face and a rearward direction through the back face, wherein the LEDs are high intensity, narrow beam LEDs configured to project directional light to enable the LEDs to be visible for a substantial distance; and
   d) wherein the impact resistant plastic material is configured to internally reflect a portion of the light from the plurality of narrow beam LEDs from one side of the transparent housing to another side of the transparent housing to enable a substantially omnidirectional visibility of the warning beacon through the transparent front face, the transparent back face, and the transparent side edges.

2. A warning beacon in accordance with claim 1, further comprising a base configured to support the housing.

3. A warning beacon in accordance with claim 2, wherein the base comprises a structure selected from the group consisting of fixed legs, folding legs, a magnetic mount, a battery pack, and a support flange.

4. A warning beacon in accordance with claim 1, wherein the mounting plate comprises a printed circuit board including control circuitry and electronic components for actuation and control of the LEDs.

5. A warning beacon in accordance with claim 1, wherein the plurality of LEDs comprises a plurality of clusters of LEDs, each cluster containing at least two LEDs.

6. A warning beacon in accordance with claim 5, wherein the clusters of LEDs include clusters oriented in substantially orthogonal directions.

7. A warning beacon in accordance with claim 1, wherein the plurality of LEDs are configured to flash in a substantially random pattern.

8. A warning beacon in accordance with claim 1, wherein the plurality of LEDs further include LEDs oriented to provide light in a direction substantially perpendicular to the front face.

9. A warning beacon in accordance with claim 1, wherein the LEDs produce light of a color selected from the group consisting of red, orange, amber, white, blue, and green.

10. A warning beacon in accordance with claim 1, further comprising a power supply.

11. A warning beacon in accordance with claim 10, wherein the power supply comprises one or more dry cell batteries.

12. A warning beacon in accordance with claim 11, further comprising a battery mount disposed on an outside of the housing.

13. A warning beacon in accordance with claim 10, wherein the power supply is configured to accommodate an input voltage of from 6v to 36v DC.

14. A warning beacon in accordance with claim 10, wherein the power supply is configured to be wired directly to a piece of equipment.

15. A warning beacon in accordance with claim 1, wherein the housing enhances a luminescence of the plurality of LEDs.

16. A warning beacon in accordance with claim 1, further comprising light reflective material disposed on the housing.

17. A warning beacon in accordance with claim 1, further comprising a warning sign disposed adjacent the housing.

18. A warning beacon, comprising:
   a) a base;
   b) a transparent housing, supported by the base, having a three-dimensional triangular shape configured to provide substantial strength, including a front face, a back face parallel to the front face, and side edges, and enclosing an interior space;
   c) a triangularly shaped circuit board, vertically disposed in the interior space of the housing between the front and back faces;
   d) a plurality of narrow beam, high intensity LEDs, supported by the circuit board, and oriented to provide light in forward and rearward directions through the front face and back face, respectively; and
   e) wherein the transparent housing is configured to reflect within the interior space a portion of the light from the plurality of narrow beam LEDs from one side of the transparent housing to another side of the transparent housing to enable a substantially omnidirectional visibility of the warning beacon through the transparent front face, the transparent back face, and the transparent side edges.

19. A warning beacon, comprising:
   a) a transparent body, configured to be attached to a piece of equipment, having a triangular shape to provide substantial strength, an inside cavity, and a depth;
   b) a printed circuit board, vertically disposed within the cavity;
   c) a plurality of clusters of high intensity, narrow beam LEDs, supported by the circuit board, oriented to provide directional light in at least one direction through the transparent body, wherein the transparent body is configured to reflect a portion of the directional light from the plurality of clusters from one side of the inside cavity to another side of the inside cavity to enable a substantially omnidirectional visibility of the warning beacon through the transparent body; and
   d) control circuitry, associated with the circuit board, configured to cause the LEDs to flash in an alternating pattern.

20. A warning beacon as in claim 1, wherein the transparent housing is configured to internally reflect at least 8 percent of the light from the plurality of LEDs to enable the substantially omnidirectional visibility.

21. A warning beacon as in claim 1, wherein the narrow beam LEDs have a beam width of less than 7 degrees.

22. A warning beacon as in claim 1, wherein the substantial distance at which the high intensity, narrow beam LEDs are visible is for a distance of at least one mile.

* * * * *